United States Patent [19]

Gebhardt et al.

[11] Patent Number: 4,931,877
[45] Date of Patent: Jun. 5, 1990

[54] METHOD AND APPARATUS FOR PRODUCING A TEST SIGNAL FOR USE IN A VIDEO RECORDER

[75] Inventors: Arne W. Gebhardt, Hamburg; Horst G. Müller, Kummerfeld; Günther H. Stäcker, Kaltenkirchen, all of Fed. Rep. of Germany

[73] Assignee: U.S. Philips Corporation, New York, N.Y.

[21] Appl. No.: 259,456

[22] Filed: Oct. 17, 1988

Related U.S. Application Data

[63] Continuation of Ser. No. 934,050, Nov. 24, 1986, abandoned.

[30] Foreign Application Priority Data

Nov. 22, 1985 [DE] Fed. Rep. of Germany ....... 3541306

[51] Int. Cl.$^5$ .............................................. H04N 5/76
[52] U.S. Cl. ..................... 358/335; 358/336; 358/139; 360/27; 369/47
[58] Field of Search .................. 358/314, 335, 336, 10, 358/139, 141, 142, 257; 360/14.1, 14.2, 14.3, 27, 33.1, 38.1; 369/47

[56] References Cited

U.S. PATENT DOCUMENTS

| | | | |
|---|---|---|---|
| 4,376,290 | 3/1983 | Shirota | 358/314 |
| 4,418,364 | 11/1983 | Wine | 358/336 |
| 4,420,775 | 12/1983 | Yamazaki et al. | 360/38.1 |
| 4,423,440 | 12/1983 | Tachi | 358/335 |
| 4,428,003 | 1/1984 | Sugiyama et al. | 358/342 |
| 4,455,635 | 6/1984 | Dieterich | 369/59 |
| 4,647,974 | 3/1987 | Butler et al. | 358/142 X |
| 4,680,651 | 7/1987 | Blessinger | 360/38.1 |
| 4,729,041 | 3/1988 | Kuroda | 360/38.1 X |
| 4,786,985 | 11/1988 | Williams | 360/27 X |

OTHER PUBLICATIONS

Rundfunktechnische Mitteilungen, vol. 29, No. 4, 1985, pp. 161–169.
"Integrated Video Programming System (VPS) Decoder", Philips Technical Publication, 224, 1986, pp. 1–6.

Primary Examiner—Alan Faber
Assistant Examiner—W. R. Young
Attorney, Agent, or Firm—Michael E. Marion

[57] ABSTRACT

The invention relates to a circuit arrangement for a video recorder, which derives from a video signal the video programming data (VPS data) and generates a test signal that shows whether a television signal is present, whether interference pulses are present, whether VPS data are being transmitted and whether the transmission of the VPS data is free from errors.

9 Claims, 2 Drawing Sheets

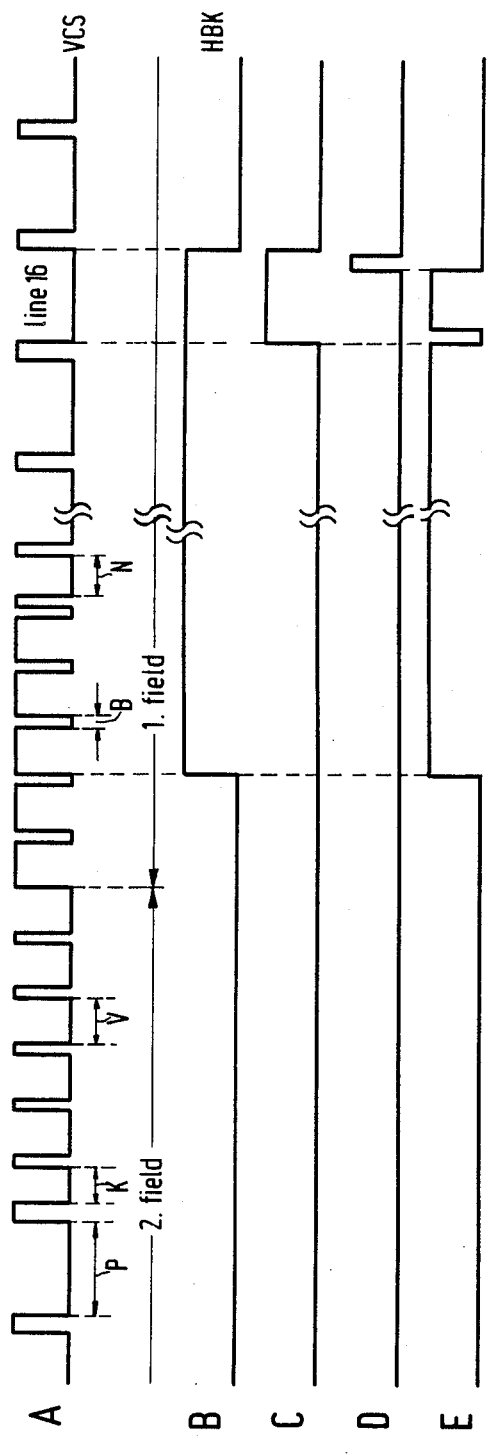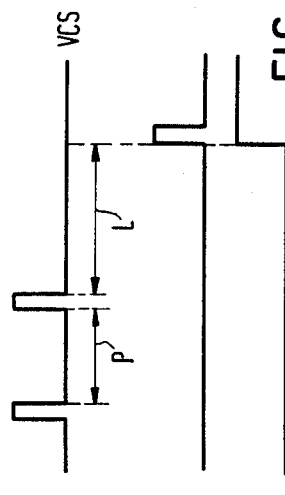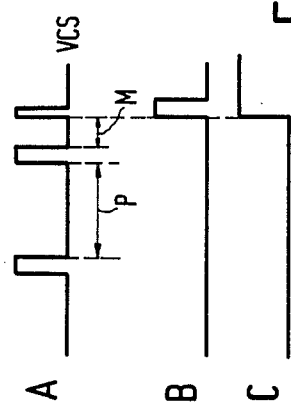

METHOD AND APPARATUS FOR PRODUCING A TEST SIGNAL FOR USE IN A VIDEO RECORDER

This is a continuation of application Ser. No. 934,050, filed Nov. 24, 1986, now abandoned.

BACKGROUND OF THE INVENTION

The invention relates to a circuit arrangement for a video recorder, with a separation circuit which, after reception of a release signal, separates the video program system data (VPS data) contained in a television signal and synchronized with a first clock signal and which, after checking the VPS data for freedom from errors, generates a control signal; with a switch which, in its first position that is present at least at the beginning of the data line, feeds a second clock signal, synchronized with the first clock signal, to a counter for measuring the intervals of the television sync pulses and in a second position feeds the sync pulses to the counter for counting the sync pulses; with a field (half-frame) identification circuit that evaluates the counter position and at the beginning of the first half-frame generates an identification signal which sets the switch from the first to the second position and which, after detection of the data line, releases the data line decoder that evaluates the counter position and generates the release signal; and with a gating circuit which generates a test signal and which, upon the appearance of the identification signal, sets the test signal to a first state and, upon the appearance of the control signal, sets it into a second state.

The Video Program System (VPS) serves for controlling the recording operation of video recorders. In line 16 of a television frame, the transmitter sends out data (VPS data) that identify a transmission. These VPS data are decoded in the video recorder and compared with the data entered and stored by the user. If the data agree, the video recorder starts recording. This form of input-controlled recording prevents misrecordings which, upon a change in program transmission, occur with respect to the announced end of transmission (over-running, contribution exchange).

In line 16, the data information consists of fifteen words, each containing 8 bits. The binary information is transmitted in biphase code at a data rate of 2.5 Mbit/s. The words eleven to fourteen are provided for the VPS data. Further information will be found in "Rundfunktechnischen Mitteilungen", Vol. 0.29, 1985, No. 4, pages 161 to 169.

The aforementioned circuit arrangement is used in the SAF 1134 P integrated circuit. This circuit decodes the VPS data, and in addition, delivers a test signal that indicates whether a television transmitter is transmitting VPS data and whether the data are being received free from errors. After the switch-over has taken place from the second to the first half-frame, the half-frame identification circuit generates an identification signal by means of which the test signal is set by the gating circuit into the first state and indicates that no VPS data are available. If error-free VPS data are present, the separation circuit generates a control signal which, at the end of line 16, sets the test signal into the second state. When the data are error-free or VPS data are not available, the test signal remains in the first state. These operating conditions can be displayed optically by means of a light-emitting diode to which the test signal is applied.

If the television signal is interrupted, the test signal remains in the state in which it happens to be at the time. Nor does the state of the test signal change when interference pulses appear. If, for example, interference pulses appear during the second state of the test signal, the test signal remains in this state and thereby indicates that processing of the VPS data is possible although no VPS data are being processed.

SUMMARY OF THE INVENTION

The object of the invention is to provide a circuit arrangement of the kind mentioned in the foregoing, designed in such a way that when interference pulses appear, or when the television signal drops out, the test signal assumes a distinct state.

This object is fulfilled by the invention in that provision is made for a detector which evaluates the counter position, which then generates a detection signal when during the first position of the switch, a pulse occurs in a particular interval between two successive horizontal pulses or when no pulse appears after a particular time which exceeds the line duration, and in that the gating circuit sets the signal into the first state when the detection signal appears.

In the circuit arrangement according to the invention, the detector measures the intervals between the television sync pulses by evaluating the counter positions. The sync pulses of a television signal consist of two pulse trains, each of which identify the beginning of a half frame, and which lie between a train of horizontal pulses. The two trains contain first, five pre-emphasis pulses, then five frame sync pulses and finally five de-emphasis pulses, each pulse being separated by half a line spacing. Before the beginning of the first half-frame the distance between the last horizontal pulse and the first pre-emphasis pulse is half a line. The detector now has to evaluate the pulse intervals in such a way that the pulse intervals that occur during the two pulse trains are not identified as interference pulses. Thus, interference pulses are only detected when a pulse interval occurs that is greater than the pulse intervals between two frame sync pulses and smaller than the intervals between the last horizontal pulse of the second half-frame and the subsequent pre-emphasis pulses. If after a certain time, which is longer than the interval between two horizontal pulses, no sync pulse occurs, the detector also generates the detection signal. After generation of the detection signal, the gating circuit sets the test signal into the first state. In the circuit arrangement according to the invention the test signal assumes a distinct state when interference pulses occur or when no television signal is present. In the second position of the switch, the detector is inoperative, since upon the occurrence of the identification signal, generated by the half-frame identification circuit, the test signal goes to the first state.

For detection of the interference pulses, it is provided that a sync pulse edge during the first setting of the switch causes first the counter setting to be read into a register contained in the detector, and then resets the counter to its initial position. The output signal from the register is then evaluated in the detector, and the detection signal is generated at a position of the counter corresponding to an interference pulse. If no television signal is present, the detection signal is generated at a particular position of the counter. There is no interim storage in a register, the counter position being directly evaluated.

In order that after decoding of the data lines the television signal can again be tested, provision is made for resetting the counter to its initial position after generation of the release signal and for resetting the switch from the second to the first position.

The VPS data contained in the video signal are fed, after separation, in the separation circuit into a storage circuit (memory). When the release signal and the control signal are present, the gating circuit generates a read-out signal, which makes the data available at the output of the memory.

For the purpose of displaying the VPS data, for example on an oscilloscope screen, a trigger pulse is generated. To that end, the gating circuit ensures that after reception of the release signal, the test signal is briefly set to the second state.

BRIEF DESCRIPTION OF THE DRAWINGS

In the following, the invention will be explained in more detail with reference to the appended drawings, in which:

FIGS. 2, 3 and 4 are diagrams illustrating FIG. 1.

DETAILED DESCRIPTION OF THE INVENTION

Figure 1:
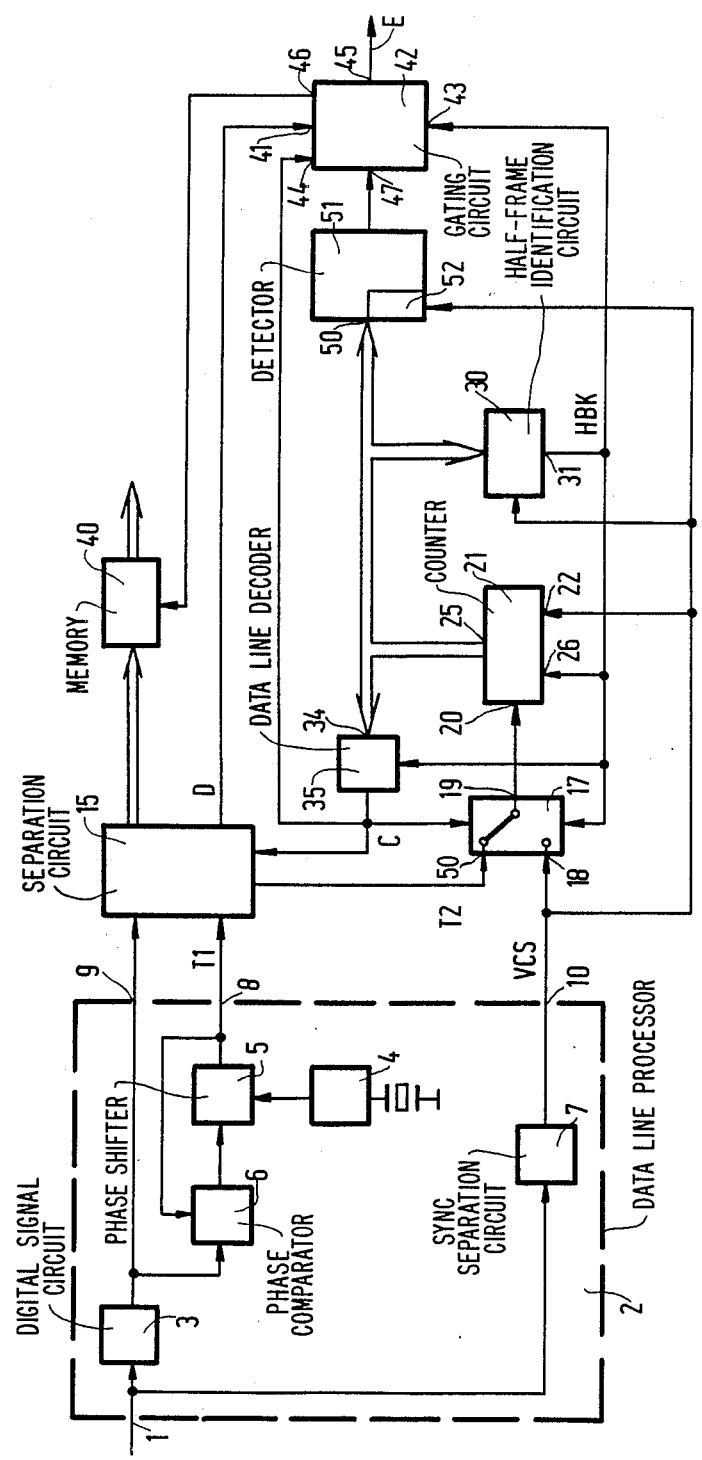
FIG. 1 shows an example of an embodiment of the invention.

In FIG. 1, a television signal is fed to the input 1 of a data line processor 2, which has passed through the usual, not further specified signal stages such as tuner, video intermediate frequency filter and demodulator, and in which line 16 contains the video program system data (VPS data). The input 1 of the data line processor 2 is also the input of a digital signal circuit 3, which derives from the television signal a digital signal that contains VPS data, and the input of a sync separation circuit 7, which separates from the television signals the sync pulses VCS. The data line processor 2 also comprises an oscillator 4, whose quartz-stabilized oscillator signal with a frequency of 10 MHz is fed to a phase shifter 5. The other input of the phase shifter 5 is connected to an output of a phase comparator 6, which receives at its first input, the output signal of circuit 3, and its second input, the output signal of the phase shifter 5. The output signal of the phase shifter 5 is a clock signal T1, synchronized with the VPS data, which is available at the output 8 of the data line processor 2. The output of circuit 3 forms an output 9 and the output of the sync separation circuit 7 an output 10 of the data line processor 2. The data line processor circuit 2, shown schematically here, is implemented on an integrated circuit chip SAA 5235.

The output 9 and the output 8 of the data line processor 2 are connected to a separation circuit 15, which separates the VPS data from the digital, and which generates from the clock signal T1 a clock signal T2 whose frequency is 0.5 MHz. The clock signal T2 is fed to an input 60 of a switch 17, whose other input 18 receives the sync pulses VCS via an input 10 of the data line processor 2. In the first setting of switch 17, the output 19 is connected to the input 0, and in the second position to the input 18. The output signal of the switch 17 is fed to the clock input 20 of a counter 21. The sync pulses VCS are fed to a release and reset input 22 of the counter 21. During the first setting of switch 17, the counter 21 is released by the trailing edge of a sync pulse in order to count the clock signal T2. The counting process is terminated by the leading edge of a sync pulse. With the trailing edge of the pulse, the counter is reset to its initial position, and a new counting process is started.

The output 25 of the counter 21 is connected to a field identification circuit 30, which generates an identification signal HBK when the switch-over takes place between the second and first fields. The identification signal HBK can be taken from the output 31 of the field identification circuit 30.

The sync pulses VCS contain two pulse trains, which identify the change-over between the two fields, and horizontal pulses. Each of the pulse trains contains five pre-emphasis pulses, five frame sync pulses and five de-emphasis pulses. Diagram A in FIG. 2 shows the pulse train that identifies the change-over between the second and the first fields. The interval V following a pre-emphasis pulse amounts to 29.65 $\mu$s, the interval B following a frame sync pulse is 4.7 $\mu$s, the interval N following a de-emphasis pulse is 29.65 $\mu$s and the interval P following a normal horizontal pulse is 59.3 $\mu$s. Before the change-over between the second and first fields, a shortened interval K of 27.3 $\mu$s occurs after the last horizontal pulse.

The counter 21 is reset by the trailing edge of a sync pulse VCS. In the counter 21, the sync pulses are, in addition, briefly delayed to allow measurement of the intervals between the pulses. By means of the leading edge of a sync pulse VCS, the counter setting is read into a memory connected to the input of the fields identification circuit 30. The latter circuit 30 evaluates the pulse intervals and only generates an identification signal HBK after it has measured the shortened pulse interval K following the last horizontal pulse of the second field and the five successive intervals V of the pre-emphasis pulses.

The identification signal HBK, shown in diagram B of FIG. 2, is fed to the switch 17, which it causes to change to its second position. The output 31 of the half-frame identification circuit 30 is connected to a reset input 26 of the counter 21. The identification signal HBK resets the counter 21 to its initial position, and releases it for counting the sync pulse VCS. The identification signal HBK also releases a data line decoder 35, whose input 34 is connected to the output 25 of the counter, and which evaluates the counter positions. The data line decoder 35 generates a release signal C when the beginning of the line 16 has been decoded from the counter position. The release signal is illustrated in diagram C of FIG. 2 and is available up to the next horizontal pulse.

The trailing edge of the release signal resets the switch 17 to its first position. The switch 17 remains in its first position until a change is again identified between the second and the first half-frame.

The release signal C is supplied to the separation circuit 15, which separates the VPS data from the video signal during the period of this release signal. A check is thereby made as to whether VPS data are available and as to whether the VPS data, transmitted in bi-phase code, contain errors. The VPS data may, for example, be read into a four-bit shift register, and then passed on to a memory 40. A clock signal, not specified here, which is also derived from the clock signal T1, is fed to the memory 40.

If VPS data are present and no biphase errors have occurred, the separation circuit 15 generates a control signal D, which is fed to an input 41 of a gating circuit 42. The control signal is depicted in diagram D of FIG.

2. To an input 43 of the gating circuit 42, the identification signal HBK is fed, and to an input 44 is fed the release signal C. The gating circuit 42 generates at the output 45 a test signal E which, in dependence on the identification signal HBK and the control signal D, can assume a first and a second state. The leading edge of the identification signal HBK sets the test signal E to the first state, and the trailing edge of the control signal sets the test signal to the second state. The second state of the test signal indicates that in the last data line, i.e. line 16, valid VPS data have been present. The test signal illustrated in diagram E of FIG. 2 can, for example, drive a light-emitting diode to give an optical indication of the existing state.

The gating circuit 42 also delivers at the output 46 a read-out signal when the release signal C is ended and the control signal appears. The read-out signal releases the output of the memory 40, and thus enables these data to be read out.

The output 25 of the counter 21 is further connected with an input 50 of a detector 51. The detector 51 generates a detection signal when interference pulses occur in the television signal, or when no television signal is present. The detection signal is fed to an input 47 of the gating circuit 42, and causes the test signal E to go into the first state.

Connected to the input 50 of detector 51 is a register 52, into which the last counter setting after the occurrence of a sync pulse or interference pulse is read. The detector 51 decides, in dependence upon the pulse interval, whether an interference pulse is present. Since the interval B following a frame sync pulse amounts to 4.7 µs and the interval K following the last horizontal pulse of the second half-frame amounts to 27.3 µs, the detector 51 only delivers a detection signal when a pulse interval has occured that is greater than 4.7 µs and smaller than 27.3 µs. FIG. 3 illustrates the case where an interference pulse occurs after a horizontal pulse. In diagram A, two horizontal pulses are followed by an interference pulse. The interval M from the last horizontal pulse to the interference pulse amounts for example to 15 µs. The detector 51 then generates, as shown in diagram B, a detection signal that changes the test signal from the first to the second state (diagram C).

FIG. 4 illustrates the case where no television signal is present, i.e. when the television signal is interrupted. Diagram A of FIG. 4 shows that, after two horizontal pulses, no further pulse follows. The detector compares the counter setting with a stored value and then delivers a detection signal when this value corresponds to a time L that is longer than the pulse interval P (diagram B of FIG. 4). The detection signal now causes the test signal to change from the second to the first state, as shown in Diagram C of FIG. 4.

A visual display of the VPS data on an oscilloscope screen can be obtained by adding a trigger pulse to the test signal. For that purpose, the gating circuit, after generating the release signal, causes the test signal to change briefly from the first to the second state, as shown in Diagram E of FIG. 2.

What is claimed is:

1. A circuit arrangement for controlling the operation of a video recorder from a television signal received thereby, said television signal comprising a digital signal periodically providing program data, a sync signal comprised of a plurality of sync pulses and a first clock signal, said circuit comprising:

(a) means for deriving from said television signal said digital signal, said sync pulses and said first clock signal;
    (b) means coupled to said deriving means, for generating a second clock signal synchronized with said first clock signal;
    (c) a counter having a first input and a second input, said second input coupled to said deriving means so as to receive therefrom said sync pulses;
    (d) a switch having a switch output coupled to said first input of said counter, a first switch input coupled to said generating means so as to receive therefrom said second clock signal and a second switch input coupled to said deriving means so as to receive therefrom said sync pulses, said switch having a first position in which said first switch input is connected to said switch output and a second position in which said second switch input is connected to said switch output, said counter measuring the intervals between said sync pulses when said switch means is in said first position, and counting said sync pulses when said switch means is in said second position;
    (e) first monitoring means coupled to said counter and said switch, for monitoring the output of said counter when said switch is in said first position so as to detect the beginning of a first field and for generating in response thereto an identification signal, said identification signal causing said switch to assume said second position;
    (f) second monitoring means coupled to said counter and said switch, for monitoring the output of said counter when said switch is in said second position so as to detect the presence of said digital signal and for generating a release signal in response thereto, said release signal causing said switch to assume said first position;
    (g) means coupled to said second monitoring means, for separating said program data from said digital signal for the duration of said release signal and for generating a control signal in response thereto;
    (h) means coupled to said counter, for providing a detection signal when said switch is in said first position and a pulse occurs in a particular interval between two successive sync pulses or no pulse occurs after a particular interval longer than the line duration of said television signal; and
    (i) means coupled to said separating means, said first monitoring means and said detection signal providing means, for generating a test signal which assumes a first state in response to said identification signal or to said detection signal, and which assumes a second state in response to said control signal.

2. A circuit arrangement for a video recorder as claimed in claim 1 further comprising means coupled to said counter for reading the output of said counter into a register contained in said first monitoring means upon each sync pulse input to said counter while said switch means is in said first position and a reset means for resetting said counter thereafter.

3. A circuit arrangement for a video recorder as claimed in claim 1 further comprising a resetting means for resetting said counter to its initial position and said switch from its second to its first position after generation of said release signal.

4. Circuit arrangement as claimed in claim 1, characterized in that said separation means feeds the separated program data to a memory, and that said means for generating a test signal comprises a gating circuit, which when the release signal and the control signal are present, generates a read-out signal that makes the program data available at the output of the memory.

5. Circuit arrangement as claimed in claim 1, characterized in that said means for generating said test signal comprises a gating circuit which after reception of the release signal, changes the test signal briefly to the second state.

6. A circuit arrangement for controlling a video recorder from a television signal received by said recorder, said television signal comprising a plurality of frames each comprising a plurality of pulses and a first field, said first field in turn comprising a data line periodically providing a data signal, said circuit comprising:
   (a) first detection means for detecting the beginning of said first field and for providing an identification signal in response thereto;
   (b) second detection means coupled to said first detection means, for detecting the beginning of the data line and for providing a release signal in response thereto;
   (c) separation means coupled to said second detection means, for separating said data signal from said data line in response to said release signal;
   (d) checking means coupled to said separation means, for checking for the presence of said data signal and for lack of errors in said data signal and for providing a control signal in response thereto;
   (e) third detection means coupled to a counter, for detecting an interference signal between two successive pulses or the absence of said pulses after a particular time interval longer than the line duration of said television signal and for providing a detection signal in response thereto;
   (f) test signal generating means coupled to said checking means, said third detection means and said first detection means, for generating a test signal which assumes a first state in response to said identification signal or said detection signal and which assumes a second state in response to said control signal.

7. A circuit arrangement for a video recorder as claimed in claim 6 further comprising a resetting means for resetting said counter to its initial position and said switch from its second to its first position after generation of said release signal.

8. The circuit of claim 6 further comprising means coupled to said third detection means, for measuring the time interval between each of said pulses and said interference signal if present and wherein said third detection means comprises a register which stores the interval for comparison to a subsequent interval.

9. The circuit arrangement of claim 6 further comprising a switch means having a first position which enables said first detection means and a second position which enables said second detection means, said switch means assuming said first position in response to said release signal.

* * * * *